(12) United States Patent
Nakhla

(10) Patent No.: US 12,734,940 B2
(45) Date of Patent: Sep. 15, 2026

(54) CHILD RESTRAINT

(71) Applicant: Dorel Juvenile Group, Inc., Foxboro, MA (US)

(72) Inventor: Said S. Nakhla, Daphne, AL (US)

(73) Assignee: Dorel Juvenile Group, Inc., Foxboro, MA (US)

(*) Notice: Subject to any disclaimer, the term of this patent is extended or adjusted under 35 U.S.C. 154(b) by 230 days.

(21) Appl. No.: 18/512,801

(22) Filed: Nov. 17, 2023

(65) Prior Publication Data

US 2024/0166096 A1 May 23, 2024

Related U.S. Application Data

(60) Provisional application No. 63/426,158, filed on Nov. 17, 2022.

(51) Int. Cl.
*B60N 2/28* (2006.01)
*B60N 2/26* (2006.01)

(52) U.S. Cl.
CPC .......... *B60N 2/2812* (2013.01); *B60N 2/265* (2013.01)

(58) Field of Classification Search
CPC .................................................. B60N 2/2812
See application file for complete search history.

(56) References Cited

U.S. PATENT DOCUMENTS

| | | | | |
|---|---|---|---|---|
| 4,456,196 | A | 6/1984 | Takada | |
| 8,272,689 | B2 * | 9/2012 | Biaud | B60N 2/2812 297/483 |
| 9,278,666 | B2 | 3/2016 | Leese | |
| 2004/0251722 | A1 * | 12/2004 | Boyle | B60N 2/2816 297/250.1 |
| 2012/0054989 | A1 * | 3/2012 | Eisinger | B60N 2/2812 24/168 |
| 2012/0074758 | A1 * | 3/2012 | Gates | B60N 2/2812 297/479 |
| 2019/0061570 | A1 | 2/2019 | Mason | |
| 2019/0232828 | A1 * | 8/2019 | Persson | B60R 22/357 |
| 2019/0263298 | A1 * | 8/2019 | Gay | B60N 2/2821 |
| 2021/0138998 | A1 * | 5/2021 | Zhang | B60N 2/2803 |

FOREIGN PATENT DOCUMENTS

WO 2023192857 A1 10/2023

* cited by examiner

*Primary Examiner* — David R Dunn
*Assistant Examiner* — Tania Abraham
(74) *Attorney, Agent, or Firm* — Barnes & Thornburg LLP

(57) ABSTRACT

A child restraint includes a juvenile vehicle seat formed to include a child-receiving space configured to hold a child for transportation in a vehicle. The child restraint further includes a harness coupled to the juvenile vehicle seat and including a central front adjuster strap, a pair of shoulder straps coupled to the central front adjuster strap, and a crotch strap configured to couple selectively with the pair of shoulder straps to secure the child to the juvenile vehicle seat within the child-receiving space. Movement of the central front adjuster strap is controlled.

20 Claims, 2 Drawing Sheets

CHILD RESTRAINT

PRIORITY CLAIM

This application claims priority under 35 U.S.C. § 119(e) to U.S. Provisional Patent Application No. 63/426,158, filed Nov. 17, 2022, which is expressly incorporated by reference herein in its entirety.

BACKGROUND

The present disclosure relates to child restraints, and particularly to a harness system for securing a juvenile to a juvenile vehicle seat. More particularly, the present disclosure relates to an adjuster for the harness.

SUMMERY

A child restraint, in accordance with the present disclosure, includes a juvenile vehicle seat and a harness coupled to the juvenile vehicle seat. The juvenile vehicle seat is formed to include a child-receiving space configured to hold a child for transportation in a vehicle. The harness includes a central front adjuster strap, a pair of shoulder straps coupled to the central front adjuster strap, and a crotch strap configured to couple selectively with the pair of shoulder straps to secure the child to the juvenile vehicle seat within the child-receiving space.

In illustrative embodiments, the child restraint further includes a strap-movement controller configured to control movement of the central front adjuster strap during adjustment of the harness by a caregiver. The central front adjuster strap is slideable relative to the strap-movement controller in an outward direction away from juvenile vehicle seat to tighten the pair of shoulder straps around the child. The central front adjuster strap is slideable through the strap-movement controller in an opposite loosening direction to lengthen the pair of shoulder straps.

In illustrative embodiments, the strap-movement controller includes a first adjuster clamp, a second adjuster clamp, and a strap tightener. The first adjuster clamp is fixed to the juvenile vehicle seat and is configured to engage selectively with the central front adjuster strap to block sliding movement of the central front adjuster strap in the loosening direction. The second adjuster clamp fixed to the juvenile vehicle seat and is configured to engage selectively with the central front adjuster strap to block sliding movement of the central front adjuster strap in the tightening direction. The strap tightener is configured to apply a force on the central front adjuster strap to pull the central front adjuster strap in the tightening direction. The strap tightener may reduce slack in the adjuster strap and/or tighten the shoulder straps around a child automatically.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

Figure 1:
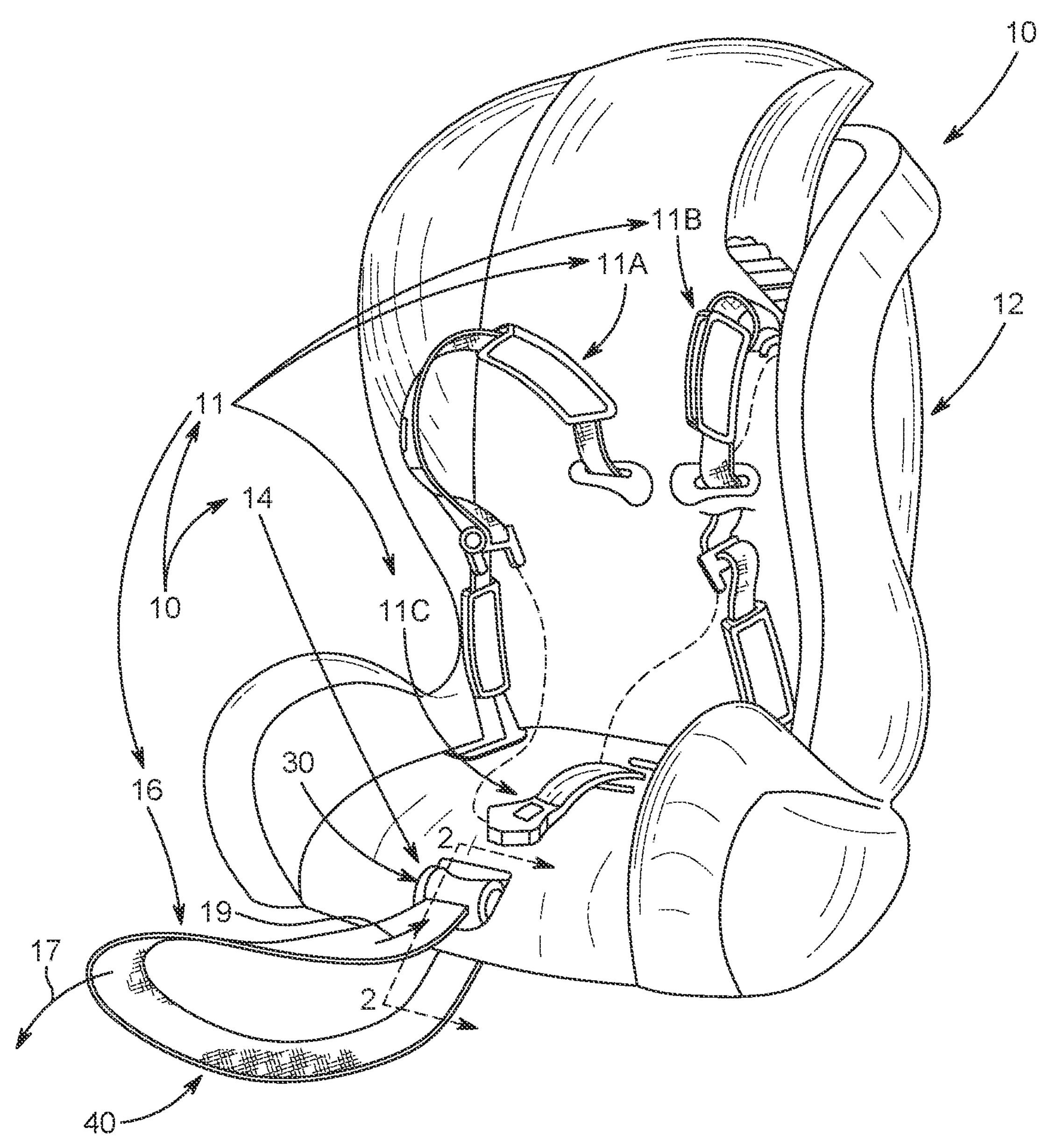
Figure 2:
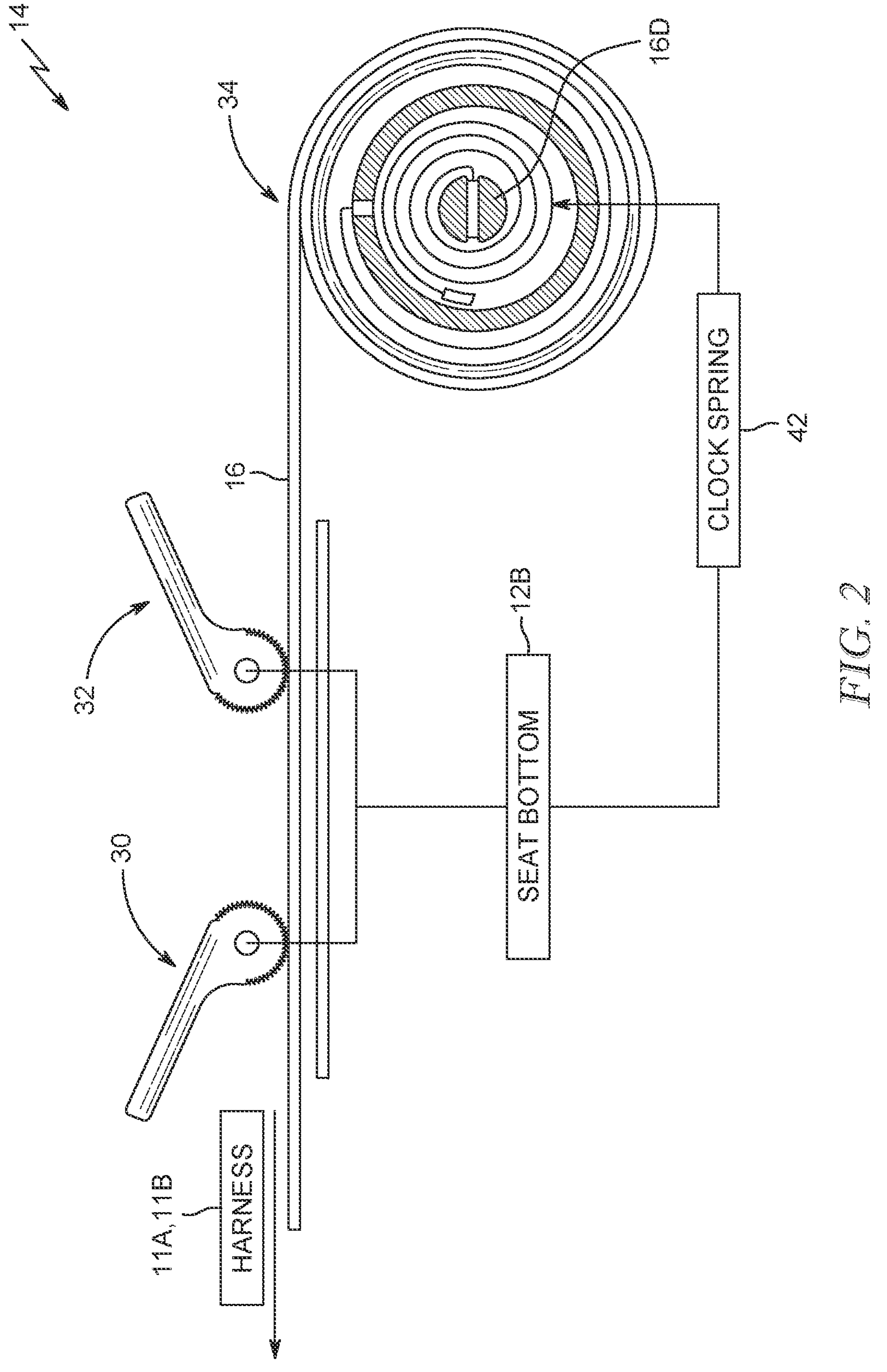

The detailed description particularly refers to the accompanying figures in which:

FIG. 1 is a perspective view of a child restraint in accordance with the present disclosure including a juvenile vehicle seat, a harness configured to secure a child to the juvenile vehicle seat and having a central front adjuster strap configured to tighten and loosen the harness, and a central front adjuster configured to control movement of the central front adjuster strap and to secure the harness around the child; and FIG. 2 is a sectional and diagrammatic view of a portion of the child restraint from FIG. 1 showing that the central front adjuster includes a first adjuster clamp, a second adjuster clamp, and a strap tightener configured to apply a tightening force on the central front adjuster strap to reduce slack in the central front adjuster strap.

DETAILED DESCRIPTION

A child restraint 10 includes a juvenile vehicle seat 12 and a harness 11 coupled to the juvenile vehicle seat 12 as shown, for example, in FIG. 1. A strap-movement controller 14 in accordance with the present disclosure is included in child restraint 10 and is configured to control movement of a central front adjuster strap 16 included in the harness 11 during adjustment of the harness 11 by a caregiver.

The harness 11 can be adjusted to fit snuggly on a child seated in the juvenile vehicle seat 12 by pulling the central front adjuster strap 16 in an outward direction 17 (also called a tightening direction) away from juvenile vehicle seat 12. An adjuster clamp 30 included in the strap-movement controller 14 acts as a one-way clutch to allow the central front adjuster strap 16 to be pulled in the outward direction 17 during a harness-tightening activity but block movement of the central front adjuster strap 16 through the adjuster clamp 30 in an opposite inward direction 19 (also called a loosening direction) unless the caregiver first operates the adjuster clamp 30 during a harness-loosening activity to release a clamping force applied normally to a portion of the central front adjuster strap 16 by the adjuster clamp 30. Thus, shoulder straps 11A and 11B included in the harness 11 can be tightened on a seated child simply by pulling the central front adjuster strap 16 in the outward direction 17 through the strap-movement controller 14. U.S. Pat. No. 8,327,507 is hereby incorporated herein in its entirety for the purpose of describing a suitable harness and clamp for a central front adjuster. In some embodiments, the central front adjuster strap 16 can be located in a different location on the juvenile vehicle seat 12 and may not be central, in which case, the central front adjuster strap 16 may be referred to as an adjuster strap 16.

In the illustrative embodiment, the central front adjuster 14 includes a first adjuster clamp 30, a second adjuster clamp 32, and a strap tightener 34 as shown in FIG. 2. The central front adjuster strap 16 is fed through the first and second adjuster clamps 30, 32 and a distal end 16D of the central front adjuster strap 16 is fixed to the strap tightener 34. The strap tightener 34 is configured to wind a portion of the central front adjuster strap 16 between the distal end 16D and first and second adjuster clamps 30, 32 so that slack 40, as shown in FIG. 1, is removed from the portion of the central front adjuster strap 16.

Both clamps 30, 32 are movable between an engaged or clamped position applying a clamping force on the central front adjuster strap 16 and a disengaged or released position at least partially released from the central front adjuster strap 16 so that the central front adjuster strap 16 is moveable in one or both directions. The first and second adjuster clamps 30, 32 cooperate with one another in the engaged position to block movement of the central front adjuster strap in both the outward and inward directions 17, 19 until one of the first and second adjuster clamps 30, 32 is moved to the disengage position. The first adjuster clamp 30 blocks movement of the central front adjuster strap 16 in the inward direction 19. The second adjuster clamp 32 blocks movement of the central front adjuster strap 16 in the outward direction 17. When the first adjuster clamp 30 is in the engaged position and the second adjuster clamp 32 is in the disengaged position, the central front adjuster strap 16 can be pulled in the outward direction 17 by a user and/or the strap tightener 34. When the second adjuster clamp 32 is in the engaged position and the first adjuster clamp 30 is in the disengaged position, the central front adjuster strap 16 can be moved in the inward direction 19 by a user by pulling on straps 11A, 11B and overcoming the tightening force provided by the strap tightener 34. At the same time, movement in the outward direction 17 by the strap tightener 34 is blocked by the second adjuster clamp 32 if the user lets go of the shoulder straps 11A, 11B.

The strap tightener 34 is configured to apply a constant tightening force on the central front adjuster strap 16 to pull the central front adjuster strap 16 in the outward direction 17. When the second adjuster clamp 32 is in the disengaged position, the central front adjuster strap 16 may be pulled in the outward direction 17 and slack 40 in the strap 16 is reduced by the strap tightener 34. The force applied by the strap tightener 34 may be sufficient to tighten the shoulder straps 11A, 11B around the child automatically.

The strap tightener 34 may be fixed to an underside of a seat bottom 12B of the juvenile vehicle seat 12. In some embodiments, the strap tightener 34 includes a clock spring 42 that winds the distal end 16D of the central front adjuster strap 16 into a spool to reduce slack 40 in the central front adjuster strap 16. In the illustrative embodiment, the strap tightener 34 is non-load bearing during impact events due to the inclusion of the first and second adjuster clamps 30, 32. Thus, the strap tightener 34 can be made completely out of plastic (except for the clock spring) which could break during impact events if the strap tightener 34 were load bearing.

In the illustrative embodiment, the first adjuster clamp 30 is located between the shoulder straps 11A, 11B and the second adjuster clamp 32, and the second adjuster strap 32 is located between the first adjuster clamp 30 and the strap tightener 34. In some embodiments, the location of the first and second adjuster clamps 30, 32 are switched.

The invention claimed is:

1. A child restraint comprising a juvenile vehicle seat formed to include a child-receiving space configured to hold a child for transportation in a vehicle, a harness coupled to the juvenile vehicle seat and including an adjuster strap, a pair of shoulder straps coupled to the adjuster strap, and a crotch strap configured to couple selectively with the pair of shoulder straps to secure the child to the juvenile vehicle seat within the child-receiving space, and a strap-movement controller configured to control movement of the adjuster strap during adjustment of the harness by a caregiver, the adjuster strap being slideable relative to the strap-movement controller in an outward direction away from juvenile vehicle seat to tighten the pair of shoulder straps around the child and slideable relative to the strap-movement controller in an opposite loosening direction to loosen the pair of shoulder straps around the child, wherein the strap-movement controller includes a first adjuster configured to block sliding movement of the adjuster strap in the loosening direction, a second adjuster configured to block sliding movement of the adjuster strap in the tightening direction, and a strap tightener configured to apply a force on the adjuster strap to pull the adjuster strap in the tightening direction, and wherein the first adjuster is located between the shoulder straps and the strap tightener so that the strap tightener is outside of a load-bearing path of the adjuster strap during impact events.

2. The child restraint of claim 1, wherein the adjuster strap is fed through the first and second adjusters and a distal end of the adjuster strap is coupled to the strap tightener, and the strap tightener is configured to wind a portion of the adjuster strap between the distal end and the first and second adjuster adjusters so that slack in the adjuster strap is removed from the adjuster strap.

3. The child restraint of claim 2, wherein the strap tightener includes a clock spring to constantly apply force on the portion of the adjuster strap in the tightening direction.

4. The child restraint of claim 3, wherein the strap tightener includes plastic materials.

5. The child restraint of claim 1, wherein the first and second adjusters are movable relative to the juvenile vehicle seat between a clamped position engaged with the adjuster strap and a released position to allow tightening and loosening of the adjuster strap.

6. The child restraint of claim 5, wherein, when the second adjuster is in the released position, the strap tightener is configured to tighten the shoulder straps around the child by pulling the adjuster strap in the tightening direction.

7. The child restraint of claim 5, wherein the strap tightener is configured to apply force constantly on the adjuster strap in the tightening direction so that the shoulder straps tighten automatically when the second adjuster is in the released position.

8. A child restraint comprising a juvenile vehicle seat formed to include a child-receiving space configured to hold a child for transportation in a vehicle, a harness coupled to the juvenile vehicle seat and including an adjuster strap, a pair of shoulder straps coupled to the adjuster strap, and a crotch strap configured to couple selectively with the pair of shoulder straps to secure the child to the juvenile vehicle seat within the child-receiving space, and a strap-movement controller configured to control movement of the adjuster strap during adjustment of the harness by a caregiver, the adjuster strap being slideable relative to the strap-movement controller in an outward direction away from juvenile vehicle seat to tighten the pair of shoulder straps around the child and slideable relative to the strap-movement controller in an opposite loosening direction to loosen the pair of shoulder straps around the child, wherein the strap-movement controller includes a first adjuster configured to block sliding movement of the adjuster strap in the loosening direction, a second adjuster configured to block sliding movement of the adjuster strap in the tightening direction, and a strap tightener configured to apply a force on the adjuster strap to pull the adjuster strap in the tightening direction, wherein the first and second adjusters are movable relative to the juvenile vehicle seat between a clamped position engaged with the adjuster strap and a released position to allow tightening and loosening of the adjuster strap, and wherein the first and second adjusters are movable relative to the juvenile vehicle seat between the clamped position and the released position independently of one another.

9. The child restraint of claim 8, wherein the first adjuster is located between the shoulder straps and the strap tightener so that the strap tightener is outside of a load-bearing path of the adjuster strap during impact events.

10. The child restraint of claim 9, wherein the adjuster strap is fed through the first and second adjusters and a distal end of the adjuster strap is fixed to the strap tightener, and the strap tightener is configured to wind a portion of the adjuster strap between the distal end and the first and second adjusters so that slack in the adjuster strap is removed from the adjuster strap.

11. The child restraint of claim 10, wherein the strap tightener includes a spring to constantly apply force on the portion of the adjuster strap in the tightening direction.

12. The child restraint of claim 11, wherein the strap tightener includes plastic materials.

13. The child restraint of claim 8, wherein the first and second adjusters are biased toward the clamped position.

14. A child restraint comprising a juvenile vehicle seat formed to include a child-receiving space configured to hold a child for transportation in a vehicle, a harness coupled to the juvenile vehicle seat and including an adjuster strap, a pair of shoulder straps coupled to the adjuster strap, and a crotch strap configured to couple selectively with the pair of shoulder straps to secure the child to the juvenile vehicle seat within the child-receiving space, and a strap-movement controller configured to control movement of the adjuster strap during adjustment of the harness by a caregiver, the adjuster strap being slideable relative to the strap-movement controller in an outward direction away from juvenile vehicle seat to tighten the pair of shoulder straps around the child and slideable relative to the strap-movement controller in an opposite loosening direction to loosen the pair of shoulder straps around the child, wherein the strap-movement controller includes an adjuster clamp configured to engage selectively with the adjuster strap to block sliding movement of the adjuster strap in the loosening direction and a strap tightener configured to apply a force on the adjuster strap to pull the adjuster strap in the tightening direction, and wherein the adjuster clamp is located between the shoulder straps and the strap tightener so that the strap tightener is outside of a load-bearing path of the adjuster strap during impact events.

15. The child restraint of claim 14, wherein the adjuster clamp is a first adjuster clamp and the strap-movement controller further includes a second adjuster clamp, and the first and second adjuster clamps are movable relative to the juvenile vehicle seat between a clamped position engaged with the adjuster strap and a released position to allow tightening and loosening of the adjuster strap.

16. The child restraint of claim 15, wherein the first and second adjuster clamps are movable relative to the juvenile vehicle seat between the clamped position and the released position independently of one another.

17. The child restraint of claim 16, wherein the first and second adjuster clamps are biased toward the clamped position.

18. The child restraint of claim 15, wherein, when the second adjuster clamp is in the released position, the strap tightener is configured to tighten the shoulder straps around the child by pulling the adjuster strap in the tightening direction.

19. The child restraint of claim 15, wherein the strap tightener is configured to apply force constantly on the adjuster strap in the tightening direction so that the shoulder straps tighten automatically when the second adjuster clamp is in the released position.

20. The child restraint of claim 14, wherein the adjuster strap is fed through the adjuster clamp and a distal end of the adjuster strap is coupled to the strap tightener, and the strap tightener is configured to wind a portion of the adjuster strap so that slack in the adjuster strap is removed from the adjuster strap.

* * * * *